May 12, 1959     F. B. SEEBERGER     2,885,720
CASTER
Filed Nov. 4, 1955
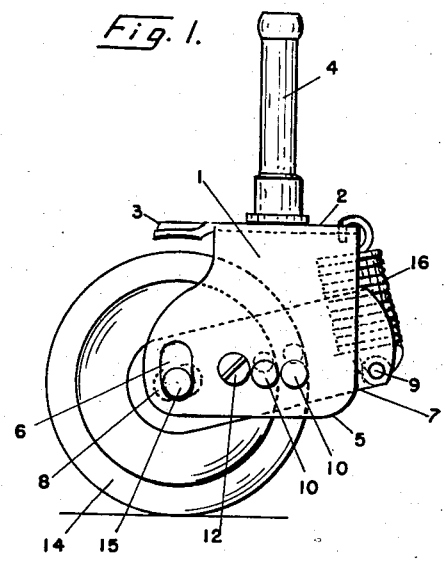
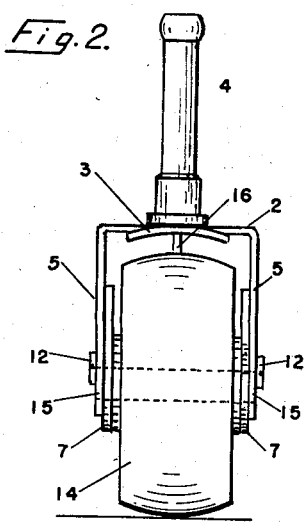
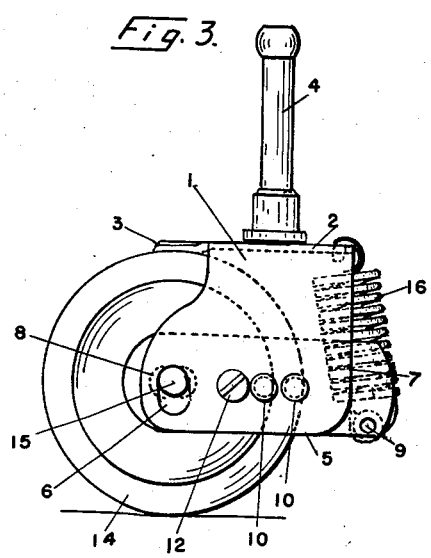
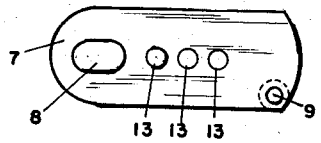
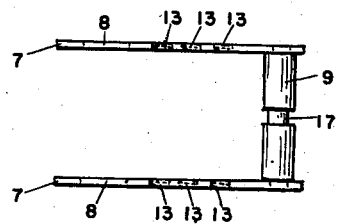
FRED B. SEEBERGER    Inventor

United States Patent Office 2,885,720
Patented May 12, 1959

2,885,720
CASTER

Fred B. Seeberger, Yeadon, Pa.; Bertha Seeberger, executrix of said Fred B. Seeberger, deceased, assignor to George J. Segal, Philadelphia, Pa.

Application November 4, 1955, Serial No. 545,069

5 Claims. (Cl. 16—44)

This invention relates to casters for furniture and specifically to Hollywood beds and other articles of like character.

The object of this invention is to provide a caster that automatically locks the wheel when the item to which it is applied is occupied or loaded as the case may be.

Another object of this invention is to provide a caster that may be assembled to carry a predetermined load before locking of the roller automatically takes place.

A further object of this invention is to provide a self locking caster which will not oscillate when the article to which it is applied is occupied, or loaded and which permits free rolling in its normal or unloaded position.

In the accompanying drawings, Figure 1 is a side elevation of the caster in normal operative position, and Fig. 2 shows the front elevation of the caster, and Fig. 3 shows a side elevation of the caster in locked position, and Fig. 4 is a plan view of a link assembly, and Fig. 5 is a side elevation of a link.

The reference numerals indicate the same parts in the several drawings.

In the practice of the invention as hereinafter exemplified, the caster comprises a horn 1, having an upper or flat portion 2, with a forward extending wheel engaging projection 3, and a pintle 4 rigidly mounted therein. Dependent legs 5 of the horn 1, are provided with vertical elongated slots 6 centrally disposed below the wheel engaging projection 3 in the top flat portion of the horn. A series of clear fulcrum openings 10 are longitudinally and equidistantly disposed adjacent the vertical slots 6.

A link or lever assembly such as is shown in Figs. 4 and 5 comprises a pair of links 7 having elongated longitudinal slots 8 centrally disposed at one end thereof and bisecting the slots 6 of the legs of the horn, and a series of tapped fulcrum holes or openings 13 adjacent said longitudinal slots in the links are disposed therein in spaced relationship with those in the legs 5 of the horn 1. A spacing bar 9 is interposed between the links 7 and rigidly secured thereto to hold the links in proper relationship to each other and the space between the legs 5 of the horn.

This link assembly is placed between the legs 5 and aligned with the respective slots 6 in the legs and elongated slots 8 in the links and a fulcrum stud or screw 12 is passed through the clear hole 10 in leg 5 into the tapped hole 13 in the link adjacent said leg to provide a fulcrum for the lever action of said links.

A wheel 14 is placed in the assembly and is held in rotatable and operative position by means of an axle 15 floatably mounted in the elongated slots 6 in the legs 5 and slots 8 in the links 7, the outer ends of said axle 15 being secured by conventional means well known in the art.

A closed coil tension spring 16 of predetermined load capacity is secured at one end to the spacing bar 9 in the link assembly in the relief groove 17, the other end of the spring being secured in a suitable hole in the flat portion 2 of the horn. The tension of the spring through the lever action of the link assembly forces the wheel 14 with its supporting axle to the lower end of the vertical slots 6 in the legs 5 of the horn. In this position the wheel is free to roll and the caster may oscillate on the pintle 4.

The load carrying capacity of the spring 16 may be modified by placing the fulcrum studs or shoulder screws 12 in any pair of holes in the legs 5 and links 7 to increase or decrease the load carrying capacity of the caster. When for example the caster is applied to a Hollywood bed having an unoccupied load of about 120 pounds, the casters are adjusted to sustain a load of 135 pounds. Under these conditions the bed may be freely moved for cleaning or other reasons. However, when such bed is sat upon or occupied for sleeping the spring tension is overcome and the wheel 14 with its axle 15 moves upward in the respective slots in the assembly to lock the wheel against the projection 3 on the flat portion 2 of the horn to prevent further movement of the bed during occupancy, as is shown in Fig. 3.

It will be seen and readily understood that with springs of different load capacities combined with the facility for changing the fulcrum and consequent leverages that numerous load capacities may be formulated to meet any requirement demand in a caster of this type and for which it is suitable.

Load carrying capacities can be determined for a specific weight and critical overload factors calculated so that when the article to which the caster is applied is properly loaded or unoccupied as the case may be, the article may be moved freely, whereas a fractional overload will automatically lock the caster against undesired movement.

The caster shown in the drawings discloses a pintle for attaching the caster to furniture or other articles in which casters may be desirable, there are other well known means such as a flat plate with ball bearings disposed between the plate and the horn assembly which is held in operative position by means of a spacing rivet. The method of attaching the caster to furniture can be any of the well known means in the art and of themselves have no bearing on the operativeness of the present invention.

What is claimed as the invention and desired to be secured by Letters Patent is:

1. A caster comprising a horn, means to attach the horn to an article of furniture, dependent legs on the horn, a link assembly associated therewith, means pivotally mounting the link assembly to the legs of the horn, a wheel, an axle therefor carried by the link in floating relation to the legs of the horn, a spring interposed between the link assembly and the horn to normally hold the wheel in an operative position, and means constituting a part of the horn and positioned to engage the wheel and hold it in locked position when the load capacity of the spring is exceeded and the wheel and axle float in the legs of the horn.

2. A caster comprising a horn, means to attach the horn to an article of furniture, dependent legs on the horn, a link assembly associated therewith, means pivotally mounting the link assembly to the legs of the horn, a wheel, an axle therefor carried by the link in floating relation to the legs of the horn, a spring interposed between the link assembly and the horn to normally hold the wheel in an operative position, means constituting a part of the horn and positioned to engage the wheel and hold it in locked position when the load capacity of the spring is exceeded and the wheel and axle float in the legs of the horn, and means to change the position of the pivotal mounting of the link assembly with respect to the legs of the horn.

3. A caster comprising a horn, means to attach said horn to an article of furniture, dependent legs having elongated vertical slots therein, a link assembly having elongated longitudinal slots therein crossing the slots in the legs, means pivotally mounting the link assembly in the legs of the horn, a wheel, an axle therefor floatably carried by the link assembly for movement in the slots in the legs of the horn and the link assembly, a spring interposed between the link assembly and the horn to normally hold the wheel in operative position, and means on the horn to engage the wheel and hold it in locked position when the load capacity of the spring is exceeded and the wheel and axle float in the legs of the horn.

4. A caster comprising a horn, means to attach said horn to an article of furniture, dependent legs having elongated vertical slots therein, said legs having several fulcrum openings adjacent said slots, a link assembly having elongated longitudinal slots therein crossing the slots in the legs, said link assembly having several fulcrum openings adjacent said slots, means pivotally mounting the link assembly in the legs of the horn through selected fulcrum openings, a wheel, an axle floatably carried by the link assembly for movement in the slots in the legs of the horn and link assembly, a spring interposed between the link assembly and the horn to normally hold the wheel in operative position, and means on the horn to engage the wheel and hold it in locked position when the load capacity of the spring is exceeded and the wheel and axle float in the legs of the horn.

5. A caster comprising a horn, having a pair of depending parallel legs, a link assembly carried by and between said legs for movement relative thereto, an axle carried by said link, a wheel on said axle, a spring interposed between said link and the horn and normally urging the link to free wheel operative position, and said horn having means engageable against the wheel rim when said spring is overcome by a load on the horn whereby to lock the wheeel in an inoperative position preventing its rotation.

References Cited in the file of this patent

UNITED STATES PATENTS

| | | |
|---|---|---|
| 1,633,638 | Jarvis | June 28, 1927 |
| 2,707,795 | Skupas | May 10, 1955 |
| 2,709,827 | Volz | June 7, 1955 |